United States Patent
Bagepalli et al.

(10) Patent No.: US 6,257,588 B1
(45) Date of Patent: Jul. 10, 2001

(54) BRUSH SEAL AND ROTARY MACHINE INCLUDING SUCH BRUSH SEAL

(75) Inventors: Bharat Sampathkumaran Bagepalli, Niskayuna; Mahmut Faruk Aksit, Troy; Robert Russell Mayer, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/201,008

(22) Filed: Nov. 30, 1998

Related U.S. Application Data
(60) Provisional application No. 60/101,410, filed on Sep. 22, 1998.

(51) Int. Cl.[7] .................................................. F16J 15/447
(52) U.S. Cl. ........................ 277/355; 277/305; 277/307; 160/40
(58) Field of Search ................................ 277/355, 305, 277/307; 160/40, 41

(56) References Cited

U.S. PATENT DOCUMENTS

| | | |
|---|---|---|
| 2,672,640 | 3/1954 | Peterson et al. . |
| 3,819,464 * | 6/1974 | Ungerer ............................. 161/64 |
| 4,274,575 * | 6/1981 | Flower .............................. 277/53 |
| 4,467,853 * | 8/1984 | Downey, Jr. ..................... 160/133 |
| 4,600,202 | 7/1986 | Schaeffler et al. . |
| 4,649,089 * | 3/1987 | Thwaites ......................... 428/913 |
| 4,678,113 | 7/1987 | Bridges et al. . |
| 4,957,301 * | 9/1990 | Clay et al. ........................ 277/12 |
| 5,135,237 * | 8/1992 | Flower .............................. 277/53 |
| 5,474,306 * | 12/1995 | Bagepalli et al. ................. 277/53 |
| 5,613,829 | 3/1997 | Wolfe et al. . |
| 5,678,898 | 10/1997 | Bagepalli et al. . |
| 5,975,535 * | 11/1999 | Gail ................................. 277/355 |
| 6,010,132 * | 1/2000 | Bagepalli et al. ................ 277/53 |
| 6,027,121 * | 2/2000 | Cromer ........................... 277/355 |
| 6,042,119 * | 3/2000 | Bagepalli ......................... 277/355 |
| 6,059,526 * | 5/2000 | Mayr ................................. 415/231 |

FOREIGN PATENT DOCUMENTS

| | | |
|---|---|---|
| 29817657 U | 5/1998 | (DE) . |
| 1541001 | 6/1975 | (GB) . |

OTHER PUBLICATIONS

"Brush Seal Segment", N.R. Turnquist et al, SN #09/131/485, filed Aug. 10, 1998, RD–26196.
"Brush Seal For Use On Rough Rotating Surfaces", CE Wolfe et al, SN #08/942,887, filed Oct. 2, 1997, RD–25545.
"Brush Seal For Use On Bumpy Rotating Surfaces", BS Bagepalli et al, SN #08/950,082, filed Oct. 14, 1997, RD–25372.
"Anti–Hysteresis Brush Seal", NA Turnquist et al, SN #08/928,114, filed Sep. 12, 1997, RD–25199.

* cited by examiner

*Primary Examiner*—Anthony Knight
*Assistant Examiner*—Mark Williams
(74) *Attorney, Agent, or Firm*—Donald S. Ingraham; Douglas E. Stoner

(57) ABSTRACT

The brush seal includes manually-flexible, plastic-containing, brush-seal bristles attached to an elongated bristle holder. The rotary machine has a rotor and stator casing segments with segments of the brush seal positioned one each in a surface groove of a corresponding stator casing segment. In one example, the bristle holder is manually flexible, the bristles and the bristle holder define a monolithic unit, and the brush seal is coiled onto a spool from which a desired length is cut thereby avoiding the necessity of manufacturing a brush seal segment to a specific radius and a specific circumferential length to match a particular stator casing segment.

17 Claims, 4 Drawing Sheets

BRUSH SEAL AND ROTARY MACHINE INCLUDING SUCH BRUSH SEAL

This application claims priority of a Provisional Application entitled "Plastic Brush Seals" by Bharat S. Bagepalli, et al., Ser. No. 60/101,410 filed Sep. 22, 1998.

BACKGROUND OF THE INVENTION

This invention relates to seals, and, more particularly, to a brush seal for a rotary machine.

Rotary machines include, without limitation, turbines for steam turbines and compressors and turbines for gas turbines. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

Annular brush seals have been used, or proposed for use, between a rotor and a surrounding casing (i.e., stator casing) in gas and steam turbines. A gas or steam turbine brush seal is made up of circumferentially-arrayed brush seal segments. Each brush seal segment includes a plurality of flexible, metal-wire bristles attached to (e.g., welded to) a metal bristle holder which has a shape of an annular segment of a circular ring. The bristle holder has a fixed radius and a fixed circumferential length corresponding to the radius and circumferential length of the surface groove of the annular casing segment into which the bristle holder, with attached bristles, is inserted. The bristle holder may include a backing plate positioned between the bristles and the lower-pressure side of the seal with the free ends of the bristles radially-inwardly-extending beyond the radially-inward end of the backing plate.

BRIEF SUMMARY OF THE INVENTION

In a first embodiment, a brush seal of the invention includes manually-flexible, plastic-containing, brush-seal bristles and an elongated bristle holder. The bristles each have a fixed end and a free end. The fixed ends of the bristles are fixedly-attached to the bristle holder. In one construction, the bristle holder is manually flexible and hand-tool-cutable with the bristle holder and the bristles together being a monolithic unit and with the bristle holder with the fixedly-attached bristles being manually flexible to a shape of a multi-turn coil.

In a second embodiment, a rotary machine of the invention includes a rotor, stator casing segments, and brush seal segments. The rotor has a longitudinal axis. The stator casing segments are circumferentially arrayed together creating a stator casing which is generally coaxially aligned with the axis and which circumferentially surrounds and is radially spaced apart from the rotor. Each stator casing segment has a surface groove which together create a circumferential channel which is generally coaxially aligned with the axis and which is open to the rotor. Each brush seal segment includes manually-flexible, plastic-containing, brush-seal bristles and an elongated bristle holder. The bristles each have a fixed end and a free end. The fixed ends of the bristles are fixedly-attached to the bristle holder. The bristle holder is positioned in the surface groove of a corresponding stator casing segment. In one construction, the bristle holder is manually flexible with the positioned bristle holder being in a flexed state, and the bristle holder is hand-tool-cutable to a circumferential length with the positioned bristle holder having a hand-tool-cut circumferential end.

Several benefits and advantages are derived from the invention. It is noted that most plastics are electrically non-conductive and such plastic bristles can be used in applications in electrical generators for which prior-art brush seals were unsuitable. A flexible and hand-tool-cutable bristle holder allows the brush-seal to be wound with multiple turns on a spool, taken to the location of an existing rotary machine needing seal replacement, and then cut to the required circumferential length and flexibly inserted into a surface groove of arbitrary radius whereas prior-art brush seal segments were individually made at the factory to a specific radius and circumferential length. A monolithic plastic brush seal allows, in effect, the bristles to be created from an enlarged bristle holder and avoids the prior art difficulties of attaching the fixed ends of distinct bristles to the bristle holder.

DETAILED DESCRIPTION OF THE INVENTION

Figure 1:
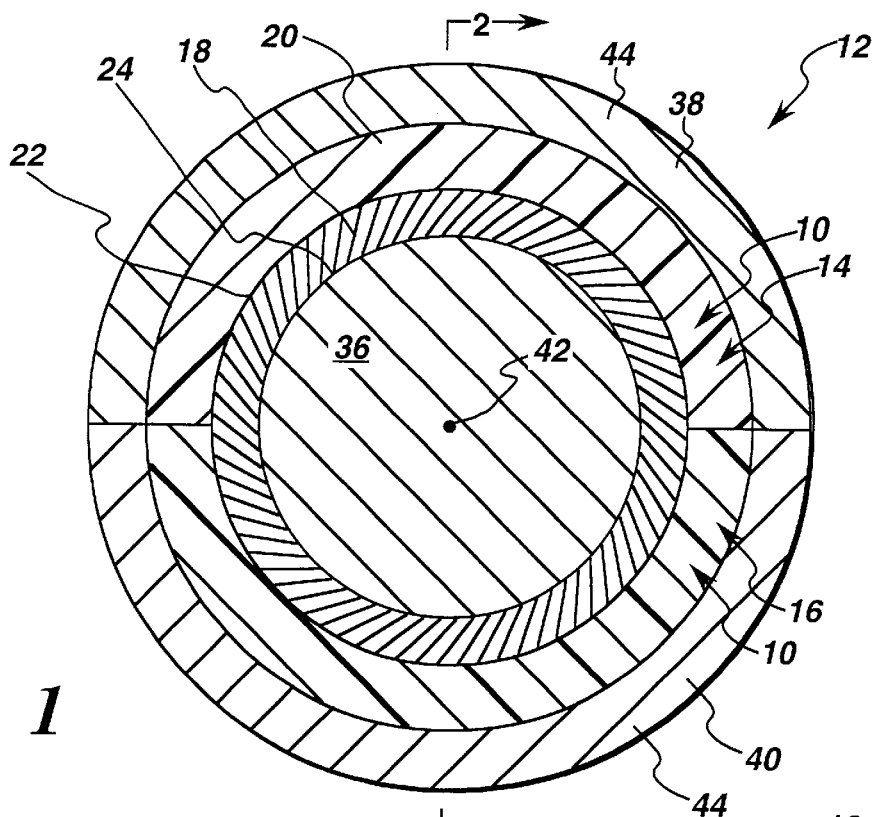
FIG. 1 is a cross-sectional view of an embodiment of the rotary machine of the invention and of the brush seal of the invention taken by a cutting plane which is perpendicular to the longitudinal axis of the rotor of the rotary machine.
Figure 2:
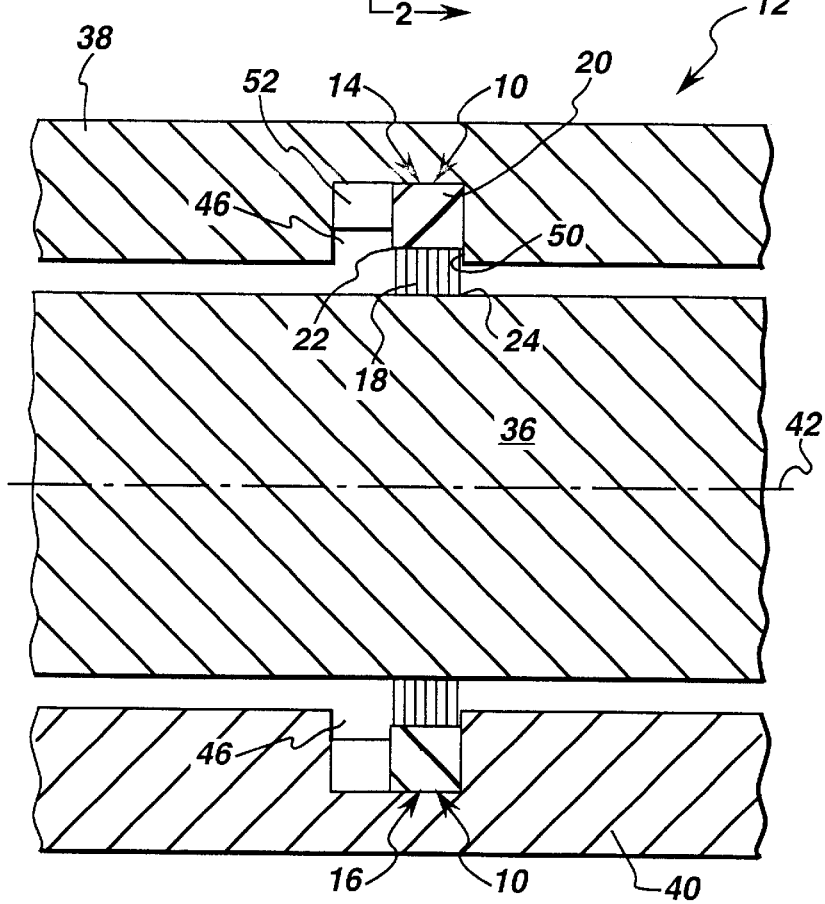
FIG. 2 is a cross-sectional view of the rotary machine and the brush seal of FIG. 1 taken along lines 2—2 of FIG. 1.

Referring now to the drawings, FIGS. 1–2 schematically show an embodiment of the brush seal 10 of the invention and an embodiment of the rotary machine 12 of the invention. The brush seal 10, when installed as part of a rotary machine, typically comprises a plurality of brush seal segments 14 and 16. FIG. 1 shows the brush seal 10 as having two brush seal segments 14 and 16, but it is understood that more brush seal segments are usually employed. Rotary machines include, but are not limited to, an electric generator, or a high, medium, or low pressure turbine of a steam turbine, or a compressor or turbine section of a gas turbine.

The brush seal 10 of the invention has many applications such as, but not limited to, sealing a gap between two surfaces at rest, two surfaces at least one of which is undergoing vibration, two surfaces at least one of which is undergoing rotation, and two surfaces at least one of which is undergoing linear oscillation. The gap may be annular, rectangular, or of arbitrary shape. The brush seal 10 generally seals the gap against fluid leakage between a higher pressure region and a lower pressure region, with such fluid including, but not limited to, air, combustion gasses, steam, and a mixture of hydrogen and an oil mist.

The brush seal 10 includes a plurality of manually-flexible brush-seal bristles 18 and an elongated bristle holder 20. The bristles 18 each comprise a plastic and have a fixed end 22 and a free end 24. The fixed ends 22 of the bristles 18 are fixedly attached to the bristle holder 20. The term "plastic" is defined as "A polymeric material (usually organic) of large molecular weight which can be shaped by flow; usually refers to the final product with fillers, plasticizers, pigments, and stabilizers included (versus the resin, the homogeneous polymeric starting material); examples are polyvinyl chloride, polyethylene, and urea-formaldehyde", such definition being found in the fourth edition of the *McGraw-Hill Dictionary of Scientific and Technical Terms* (1989). In a first example, the bristles 18 each comprise at least fifty weight percent plastic, and in a second example, the bristles 18 consist essentially of a plastic. For the purpose of describing the invention, the terminology "a plastic" includes mixtures of plastics.

Figure 3:
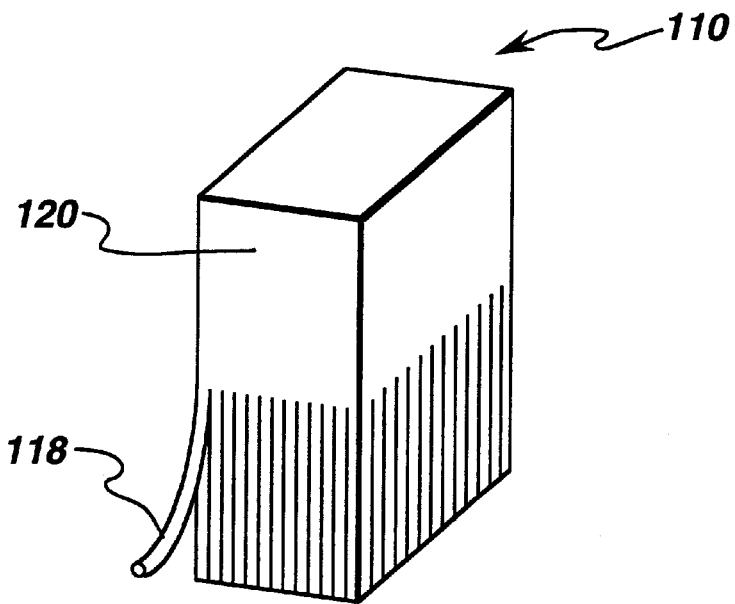
FIG. 3 is a perspective schematic view of a first construction of a portion of the brush seal of FIG. 1 showing the bristle holder and attached bristles as a monolithic unit.
Figure 4:
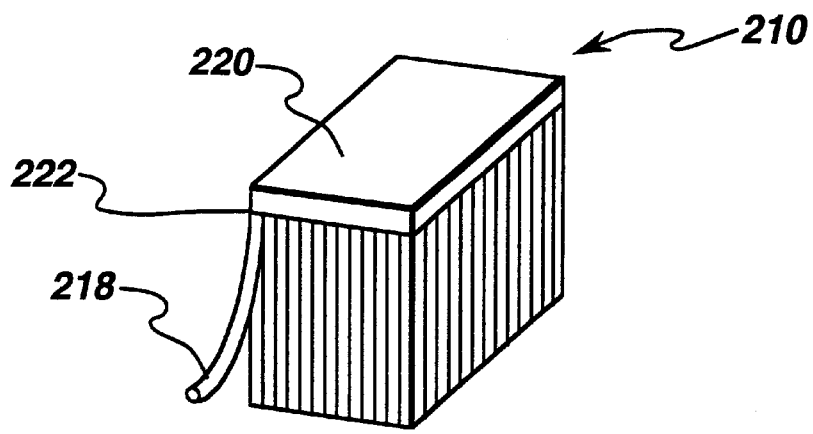
FIG. 4 is a perspective schematic view of a second construction of a portion of the brush seal of FIG. 1 showing the bristle holder as a distinct unit from the bristles.

In a first construction of the brush seal 110 of the invention, as shown in FIG. 3, the bristle holder 120 and the bristles 118 together define a monolithic unit. It is noted that one of the bristles 118 is shown in a flexed state in FIG. 3. The bristle portion of the monolithic unit is formed by conventional techniques, as is known to the artisan, such as that used to produce the bristles of a baby's plastic one-piece hair brush. In a second construction of a brush seal 210 of the invention, as shown in FIG. 4, the bristle holder 220 is a distinct unit from the bristles 218. Here, in one example (not shown), the bristle holder is a metal (such term including an alloy), and in another example, the bristle holder 220 comprises or consists essentially of a plastic. In one assembly, the fixed ends 222 of the bristles 218 are adhesively bonded to the bristle holder 220.

Figure 5:
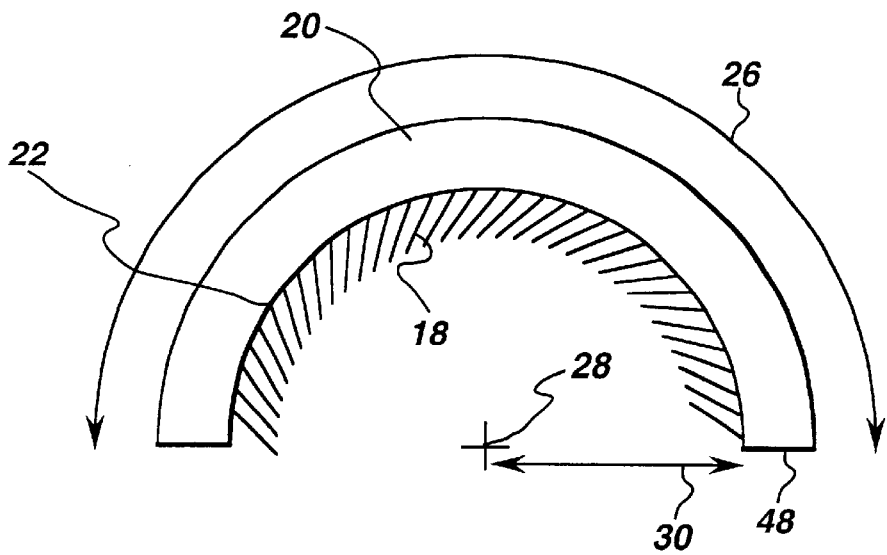
FIG. 5 is a front view of one of the brush seal segments of FIG. 1 shown flexed to a first shape.

In a first design, as seen in FIG. 5, the bristle holder 20 (of a brush seal segment 14 and hence of the brush seal 10) is manually flexible to a first shape of generally a first annular segment of a first circular ring (such as the ring formed by the bristle holders of the brush seal segments 14 and 16 of the brush seal 10 as seen in FIG. 1). The first annular segment has a first circumferential length 26, a longitudinal axis 28, and a first radius 30. The bristles 18 are disposed longitudinally and radially generally entirely within the first annular segment when the bristle holder 20 is flexed to the first shape, as seen in FIG. 2. Typically, as seen in FIGS. 1 and 5, each bristle 18 is canted at a generally forty-five degree angle from a radius line extending from the first longitudinal axis 28 to the fixed end 22 of each bristle 18.

Figure 6:
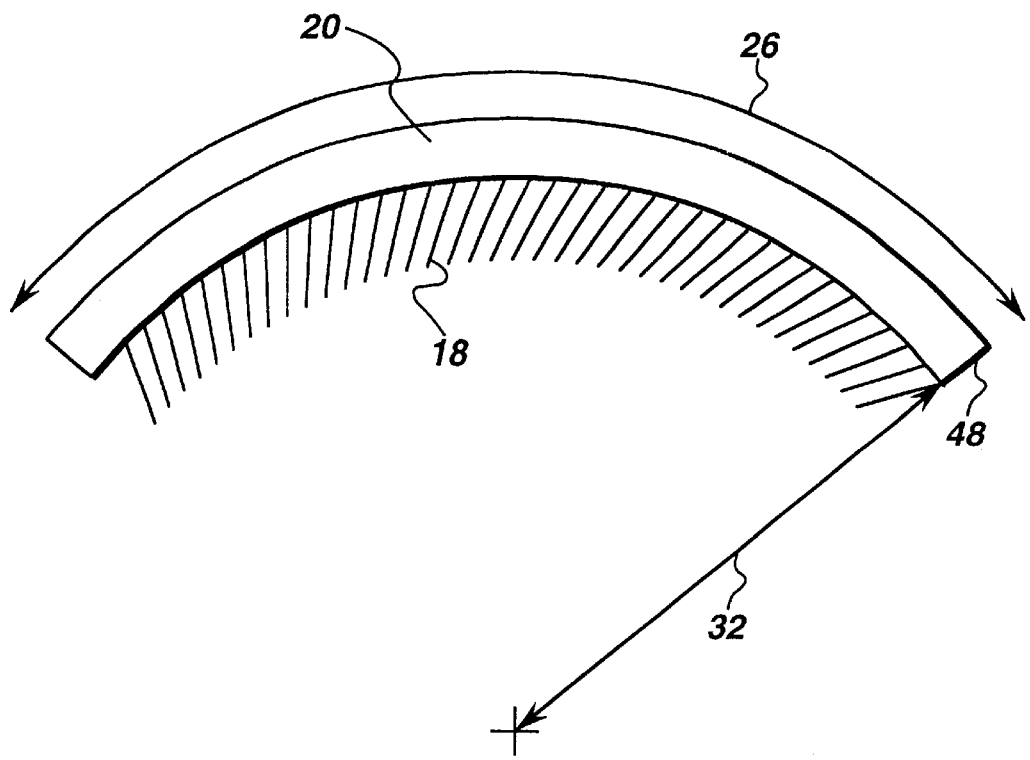
FIG. 6 is a front view of the brush seal segment of FIG. 5 shown flexed to a second shape.

Additionally, in this design, the bristle holder 20 (of the brush seal segment 14 and hence of the brush seal 10) is manually flexible to a second shape of generally a second annular segment of a second circular ring, as seen in FIG. 6. The second annular segment has the same first circumferential length 26 as the first annular segment and has a second radius 32 which is different from the first radius 30. The bristles 18 are disposed longitudinally and radially generally entirely within the second annular segment when the bristle holder 20 is flexed to the second shape.

Figure 7:
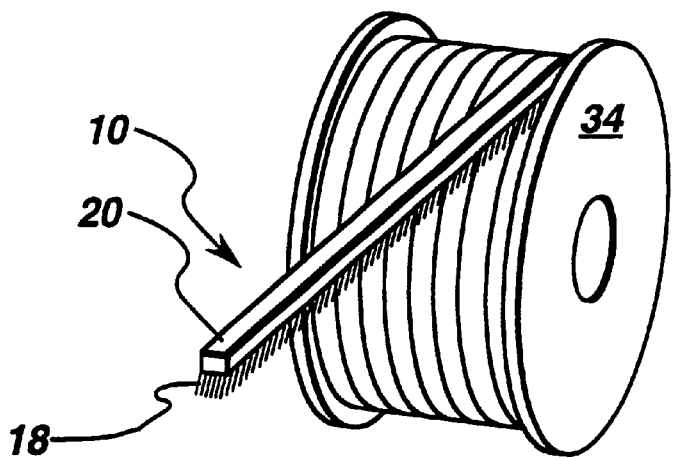
FIG. 7 is a perspective schematic view of the brush seal of FIG. 1 wound around a spool and before any brush seal segment is cut from the spool.

Furthermore, in this design, the bristle holder 20 is manually flexible to a shape of a multi-turn coil. Typically, as seen in FIG. 7, the bristle holder 20 with the fixedly-attached bristles 18 is wound on a spool 34. Here, the bristle holder 20 with the fixedly-attached bristles 18 is hand-tool-cutable to a circumferential length which is less than the first circumferential length 26. In another design, the bristle holder (not shown) is manually rigid and is manufactured to a particular shape.

The rotary machine 12 includes a rotor 36, a plurality of stator casing segments 38 and 40, and a plurality of brush seal segments 14 and 16. The rotor 36 has a longitudinal axis 42. The stator casing segments 38 and 40, as shown in FIG. 1, are circumferentially arrayed together to define a stator casing 44 which is generally coaxially aligned with the longitudinal axis 42 and which circumferentially surrounds and is radially spaced apart from the rotor 36. The stator casing segments 38 and 40 each have a surface groove 46 which together define a circumferential channel which is generally coaxially aligned with the longitudinal axis 42 and which is open to the rotor 36. It is noted that a stator casing may have more than two stator casing segments.

Typically, the brush seal segment 14 or 16 is a portion of the previously-described brush seal 10 cut to length for installation into a corresponding stator casing segment 38 or 40. The brush seal segments 38 and 40 each include a plurality of flexible brush-seal bristles 18 and an elongated bristle holder 20. The bristles 18 each comprise a plastic and have a fixed end 22 and a free end 24. The fixed ends 22 of the bristles 18 are fixedly-attached to the bristle holder 20, and the bristle holder 20 is disposed in the surface groove 46 of a corresponding stator casing segment 38 or 40. The bristle holder 20 is manually flexible, and the bristle holder 20 is disposed in the surface groove 44 in a flexed state. The bristle holder 20 with the fixedly-attached bristles 18 is hand-tool cutable to a circumferential length, and the disposed bristle holder 20 has a hand-tool-cut circumferential end 48. It is noted that in a first instance the bristle holder 20 is a radially-thicker bristle holder (such as the bristle holder 120 of FIG. 3) directly engageable with the surface groove 46 of the stator casing segment 38 or 40 and that in a second instance the bristle holder is a radially-thinner (tape-like) bristle holder (such as the bristle holder 220 of FIG. 4) which itself is secured to a housing (not shown in the figures) which directly engages the surface groove 46 of the stator casing segment 38 or 40. A surface of the housing (not shown) or a surface 50 of the stator casing segment 38 serves as a brush-seal backing plate surface (as needed). In the illustration of FIG. 2, a spacer 52 helps secure the bristle holder 20 in the surface groove 46 of the stator casing segment 38 and 40.

Figure 8:
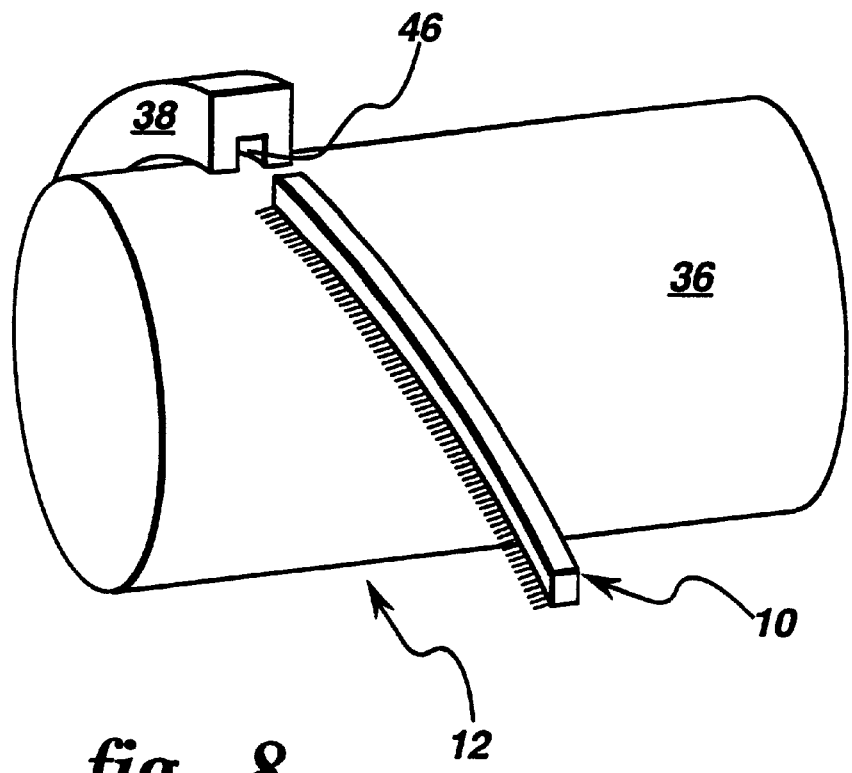
FIG. 8 is a perspective schematic view of a portion of the rotary machine of FIG. 1 with the brush seal segment of FIG. 6 about to be installed in the surface groove of a stator casing segment.

The invention has several advantages over conventional brush seals and over conventional rotary machines. Plastic brush seals are less costly than metal ones. Plastic bristles also are less stiff, less abrasive, and more corrosion resistant than metal ones and should provide excellent service, such as in low to mid range temperature environments of 150 degrees Centigrade or less for bristles made of conventional plastics. It is noted that most plastics are electrically non-conductive and such plastic bristles can be used in applications in electrical generators for which prior-art brush seals are unsuitable, such plastic brush seal also providing electrical isolation (i.e., insulation) between the sealed members. An example of such use is in a hydrogen and oil-mist environment of a hydrogen-cooled electrical generator where the oil-mist provides a "wicking" action resulting in improved sealing especially at low pressure drops and where most plastics do not have an embrittlement problem in hydrogen as would bristles made of metal. The choice of materials for the plastic bristles is left to the artisan and depends upon the temperature, etc. requirements of the operating environment. A flexible and hand-tool-cutable bristle holder allows the brush-seal to be wound with multiple turns on a spool, taken to the location of an existing rotary machine needing seal replacement, and then cut to the required circumferential length and flexibly inserted (as seen in FIG. 8) into a surface groove of arbitrary radius whereas prior-art brush seal segments were individually made at the factory to a specific radius and circumferential length to match a particular stator casing segment. A monolithic plastic brush seal allows, in effect, the bristles to be created from an enlarged bristle holder and avoids the prior art difficulties of attaching the fixed ends of distinct bristles to the bristle holder. Also, a loose plastic bristle will cause less downstream damage in a rotary machine than will a loose metal bristle.

The foregoing description of several embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A brush seal comprising an elongated bristle holder that is manually flexible to a first shape of generally a first annular segment of a first circular ring, wherein the first annular segment has a first circumferential length, a first longitudinal axis, and a first radius, and wherein said bristles comprise a plastic and have a fixed end and a free end, wherein said fixed ends are fixedly attached to said bristle holder, and said bristles are disposed longitudinally and radially generally entirely within the first annular segment when said bristle holder is flexed to the first shape.

2. The brush seal of claim 1, wherein said bristle holder is manually flexible to a second shape of generally a second annular segment of a second circular ring, wherein the second annular segment has a second radius which is different from the first radius, and wherein said bristles are disposed longitudinally and radially generally entirely within the second annular segment when said bristle holder is flexed to the second shape.

3. The brush seal of claim 2, wherein said bristle holder with said fixedly-attached bristles is hand-tool cutable to a circumferential length which is less than the first circumferential length.

4. The brush seal of claim 3, wherein said bristle holder and said bristles together define a monolithic unit.

5. The brush seal of claim 3, wherein said bristle holder is a distinct unit from said bristles.

6. The brush seal of claim 5, wherein said fixed ends of said bristles are adhesively-bonded to said bristle holder.

7. The brush seal of claim 3, wherein each bristle is canted at a generally forty-five degree angle from a radius line extending from the first longitudinal axis to said fixed end of each bristle.

8. The brush seal of claim 3, wherein each bristle consists essentially of said plastic.

9. The brush seal of claim 3, wherein said bristle holder with said fixedly-attached bristles is manually flexible to a shape of a multi-turn coil.

10. A rotary machine comprising:
   a) a rotor having a longitudinal axis;
   b) a plurality of stator casing segments circumferentially arrayed together to define a stator casing which is generally coaxially aligned with said longitudinal axis and which circumferentially surrounds and is radially spaced apart from said rotor, wherein said stator casing segments each have a surface groove which together define a circumferential channel which is generally coaxially aligned with said longitudinal axis and which is open to said rotor;
   c) a plurality of brush seal segments each including:
      (1) a plurality of manually-flexible brush-seal bristles each comprising a plastic and having a fixed end and a free end; and
      (2) an elongated bristle holder, wherein said fixed ends of said bristles are fixedly attached to said bristle holder and wherein said bristle holder is disposed in said surface groove of a corresponding stator casing segment.

11. The rotary machine of claim 10, wherein said bristle holder is manually flexible, and wherein said bristle holder is disposed in said surface groove in a flexed state.

12. The rotary machine of claim 11, wherein said bristle holder with said fixedly-attached bristles is hand-tool cutable to a circumferential length, and wherein said disposed bristle holder has a hand-tool-cut circumferential end (48).

13. The rotary machine of claim 12, wherein said bristle holder (120) and said bristles (118) together define a monolithic unit.

14. The rotary machine of claim 12, wherein said bristle holder (220) is a distinct unit from said bristles (218).

15. The rotary machine of claim 14, wherein said fixed ends of said bristles are adhesively-bonded to said bristle holder.

16. The rotary machine of claim 12, wherein each bristle is canted at a generally forty-five degree angle from a radius line extending from the longitudinal axis to said fixed end of each bristle.

17. The rotary machine of claim 12, wherein each bristle consists essentially of said plastic.

* * * * *